(12) United States Patent
Idzik et al.

(10) Patent No.: US 9,262,033 B2
(45) Date of Patent: Feb. 16, 2016

(54) STYLUS LOCATION UTILIZING MULTIPLE MAGNETOMETERS

(71) Applicant: RESEARCH IN MOTION LIMITED, Waterloo (CA)

(72) Inventors: Jacek S. Idzik, Kenilworth (CA); Cornel Mercea, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 451 days.

(21) Appl. No.: 13/713,127

(22) Filed: Dec. 13, 2012

(65) Prior Publication Data

US 2014/0168174 A1    Jun. 19, 2014

(51) Int. Cl.
G06F 3/033 (2013.01)
G06F 3/046 (2006.01)
G06F 3/0354 (2013.01)

(52) U.S. Cl.
CPC ............ *G06F 3/046* (2013.01); *G06F 3/03545* (2013.01)

(58) Field of Classification Search
CPC .............................. G06F 3/03545; G06F 3/046
USPC ...................... 345/173–179; 178/18.01–20.04
See application file for complete search history.

(56) References Cited

U.S. PATENT DOCUMENTS

| 4,697,050 A | 9/1987 | Farel et al. |
| RE33,740 E | 11/1991 | Taguchi et al. |
| 5,478,976 A | 12/1995 | Kano |
| 5,747,986 A | 5/1998 | Hristoforou |
| 6,952,201 B2 | 10/2005 | Fukushima et al. |
| 7,030,782 B2 | 4/2006 | Ely et al. |
| 7,486,270 B2 | 2/2009 | Shih |
| 7,812,268 B2 | 10/2010 | Ely |
| 8,022,317 B2 | 9/2011 | Ely |
| 8,077,152 B2 | 12/2011 | Wohlgenannt et al. |
| 8,183,476 B2 | 5/2012 | Fukushima et al. |
| 2003/0095115 A1* | 5/2003 | Brian et al. ................... 345/179 |
| 2004/0239652 A1 | 12/2004 | Taylor et al. |

(Continued)

FOREIGN PATENT DOCUMENTS

| EP | 0283687 | 9/1988 |
| GB | 2300552 | 11/1996 |

(Continued)

OTHER PUBLICATIONS

European Search Report, EP12197083.4, Jun. 3, 2013.

(Continued)

*Primary Examiner* — Amare Mengistu
*Assistant Examiner* — Stacy Khoo
(74) *Attorney, Agent, or Firm* — Jose Gutman; Fleit Gibbons Gutman Bongini & Bianco P.L.

(57) ABSTRACT

The present disclosure provides a host electronic device, a stylus and a method for determining the location of a stylus with respect to a host electronic device. A magnetic field generator of the stylus is energized and a first magnetic field is sensed at two or more magnetometers of the host electronic device. The location of the stylus with respect to the host electronic device is determined dependent upon the first magnetic field. A second magnetic field may be sensed, while the magnetic field generator is either deactivated or energized with an opposite polarity, to correct for the presence of a background magnetic field. The magnetometers may be directional magnetometers and may be arranged in an array.

21 Claims, 5 Drawing Sheets

(56) References Cited

U.S. PATENT DOCUMENTS

| | | |
|---|---|---|
| 2005/0116940 A1* | 6/2005 | Dawson ................. 345/179 |
| 2007/0188164 A1 | 8/2007 | Hodin et al. |
| 2008/0192000 A1* | 8/2008 | Choi et al. ................ 345/104 |
| 2008/0297489 A1 | 12/2008 | Funo et al. |
| 2009/0115745 A1 | 5/2009 | Chuang et al. |
| 2010/0321338 A1 | 12/2010 | Ely |
| 2012/0068975 A1 | 3/2012 | Wei et al. |
| 2013/0009907 A1* | 1/2013 | Rosenberg et al. ........... 345/174 |

FOREIGN PATENT DOCUMENTS

| | | |
|---|---|---|
| WO | WO03/054682 | 7/2003 |
| WO | WO 2006/092154 | 9/2006 |

OTHER PUBLICATIONS

European Search Report, EP12197083.4, Nov. 7, 2013.

* cited by examiner

STYLUS LOCATION UTILIZING MULTIPLE MAGNETOMETERS

BACKGROUND

Stylus pointing devices enable information to be input to a host electronic device. When the tip of a stylus is placed in close proximity to a display surface of the host device, the position of the tip may be determined by the host by a variety of methods, including the effect of the stylus on the electrical properties of the tablet (i.e., via electromagnetic induction, changes in electrical resistance, electrical capacitance, and the like); the optical properties of the tablet; or by ultrasonic positioning.

One method for determining stylus location is to employ a grid of overlapping coils embedded in a surface of the host to sense an electromagnetic field generated by a transmitter in the stylus. Typically, one set of elongated coils extends in the horizontal (X) direction and another set of elongated coils extends in the vertical (Y) direction. The sensed electromagnetic field information is processed to yield a location.

Another method energizes the X- and Y-coils of the grid sequentially and senses the resulting voltage induced in a receiving coil of the stylus.

One disadvantage of these approaches is that a large number of coils is required to provide accurate location information.

A magnetometer is a sensing device that produces an output signal, such as voltage signal, in response to an applied magnetic field. Commonly, such devices utilize a Hall sensor, which senses the voltage difference produced across a current-carrying conductor in the presence of a magnetic field, or a magnetostrictive sensor. Magnetometers are responsive to the earth's magnetic field and may be employed as compasses.

The earth's magnetic field is altered by the presence of ferrous objects. Accordingly, variations in the earth's magnetic field may be employed to detect ferrous objects by moving one or more magnetometers across a region.

A single compass embedded in an electronic device may be employed to detect changes in a magnetic field caused by movement of a magnetic object, such as a magnetic ring or pen, around the device. This approach senses motion and may be used for gesture detection, but cannot be employed to sense location due to the interfering presence of magnetic fields produced by the electronic device and by the earth's magnetic field and because the magnetic field is dependent upon the orientation of the magnetic object with respect to the electronic device.

It would be useful to provide an alternative way to accurately sense the location of a stylus with respect to a host electronic device.

BRIEF DESCRIPTION OF THE DRAWINGS

Some example embodiments of the present disclosure will be described below with reference to the included drawings such that like reference numerals refer to like elements and in which.

DETAILED DESCRIPTION

Figure 1:
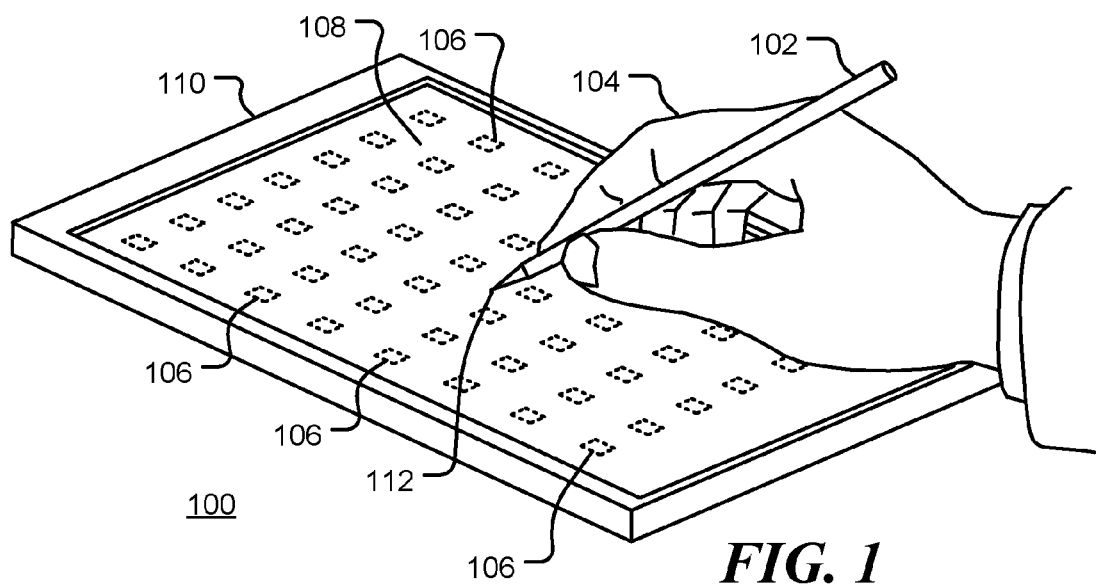
FIG. 1 is a diagram of a stylus and a host electronic device, in accordance with exemplary embodiments of the present disclosure.

For simplicity and clarity of illustration, reference numerals may be repeated among the figures to indicate corresponding or analogous elements. Numerous details are set forth to provide an understanding of the illustrative embodiments described herein. The embodiments may be practiced without these details. In other instances, well-known methods, procedures, and components have not been described in detail to avoid obscuring the disclosed embodiments. The description is not to be considered as limited to the scope of the embodiments shown and described herein.

An aspect of the present disclosure relates the determination of stylus location by a host electronic device. In operation, a magnetic field generator of the stylus generates a magnetic field that is sensed by a first directional magnetometer of the electronic device and at least one second directional magnetometer of the electronic device. The stylus location is determined dependent upon the sensed magnetic fields.

In an exemplary embodiment, a host electronic device senses first magnetic vectors at two or more magnetometers of the host electronic device, the first magnetic field vectors dependent in part upon a first magnetic field of a stylus, senses second magnetic vectors at the two or more magnetometers of the host electronic device, the second magnetic field vectors dependent in part upon a second magnetic field of the stylus, and determines the location of a stylus with respect to the host electronic device dependent upon the first and second magnetic field vectors. The measurement of two or more magnetic fields enables compensation for the background magnetic field of the host electronic device and the magnetic field of the Earth.

The host electronic device may cooperate with the stylus such that the first magnetic field of the stylus is a zero magnetic field and the second magnetic field of the stylus is a non-zero magnetic field, and then determine the location of the stylus with respect to the host electronic device dependent upon a difference between the first and second magnetic field vectors in order to compensate for a background magnetic field.

Alternatively, the host electronic device may cooperate with the stylus such that the first magnetic field of the stylus is opposite in polarity to the second magnetic field of the stylus and determine the location of the stylus with respect to the host electronic device dependent upon a difference between the first and second magnetic field vectors so as to compensate for the background magnetic field.

Cooperation between the host electronic device and the stylus may be achieved by using a communication circuit of the host electronic device to communicate with a control circuit of the stylus that controls an electric current in the coil of the stylus. Operation may be initiated by either the host electronic device or the stylus.

An example of an exemplary embodiment is depicted in FIG. 1. In FIG. 1, a stylus 102 is of a user 104 interacts with a display screen 108 of a host electronic device 110. The host electronic device 110 may be a smartphone, personal digital assistant (PDA), portable computer, tablet computer or any device utilizing a graphical user interface, for example. The magnetometers 106 are located in close proximity of the screen 108 and are used to sense a magnetic field produced by a magnetic field generator 112 of the stylus 102. The magnetic field generator 112 may be an electromagnet, for example.

Two or more magnetometers 106 may be used and may be configured in an array pattern, as depicted in FIG. 1. In an exemplary embodiment, a rectangular array of Hall sensors is employed. Such arrays may be constructed using a CMOS process, for example.

Figure 2:
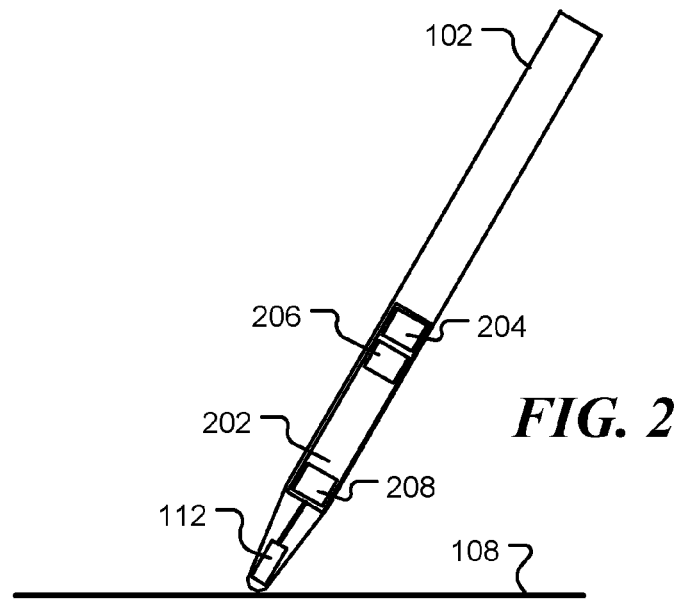
FIG. 2 is a diagram of a stylus, in accordance with exemplary embodiments of the present disclosure.

FIG. 2 is a diagram of a stylus, in accordance with some embodiments of the present disclosure. The stylus 102 includes a magnetic field generator 112, such as a coil or electromagnetic, and a control circuit 202. The control circuit 202 is operable to couple an electric current to the magnetic field generator 112. The control circuit 202 also includes a power supply 204, such as a battery, a communication module 206 for communication with a host electronic device and a contact sensor 208, then senses when the tip of the stylus is in contact with the screen of the electronic device. The contact sensor 208 may be a force sensor, for example, that senses a force applied to the tip of the stylus when it is pressed against the display 108 of a host electronic device. The magnetic field generator 112 generates a magnetic field that may be sensed by magnetometers in the host electronic device.

Figure 3:
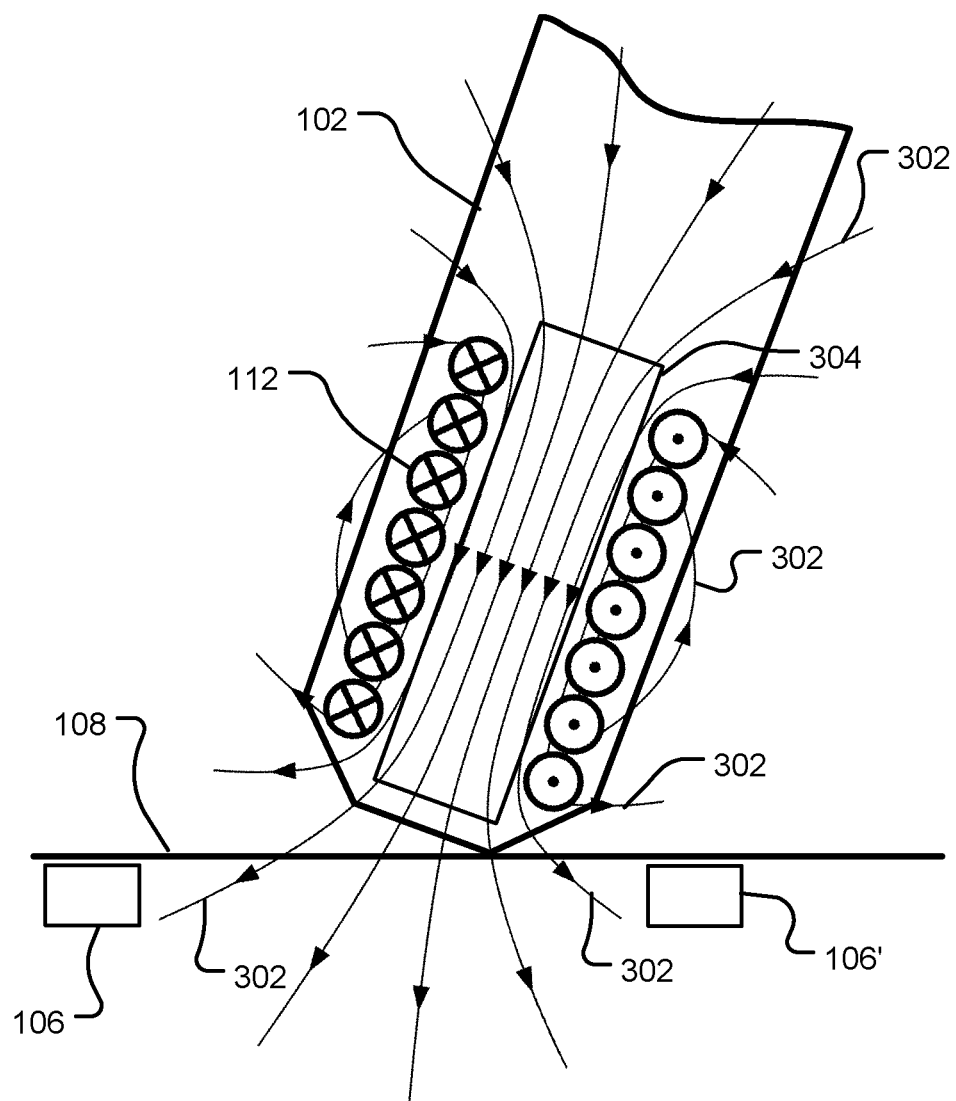
FIG. 3 is a diagrammatic representation of the tip end of a stylus, in accordance with an exemplary embodiment of the disclosure.

FIG. 3 is a diagrammatic representation of the tip end of a stylus 102, in accordance with an exemplary embodiment of the disclosure. The stylus houses a magnetic field generator 112. In this embodiment, the magnetic field generator 112 comprises a cylindrically wound coil. Optionally, the coil may surround, or be in close proximity to, a core of ferrous material 304. A ferrous core has a much higher magnetic permeability than air and strengthens the magnetic field. When an electric current is passed through the coil, an electromagnetic field is generated as indicated by the electromagnetic field lines 302. The arrows on the field lines 302 indicate the orientation or direction of the magnetic field. In accordance with known conventions, the crosses on the coil 112 indicate current flow into the page, while the dots indicate current flow out of the page. In the illustrative embodiment shown, the tip of the stylus 102 is in contact with the surface of a screen 108 on an electronic device. Two magnetometers, 106 and 106', are located in proximity to the screen 108 and are operable detect the magnetic field 302. In this embodiment, the magnetic field lines are oriented away from the tip the stylus. Measurement of the magnetic field at the magnetometers 106 and 106' may be employed to determine the location of the magnetic field generator 112 at the tip of the stylus 102.

Figure 4:
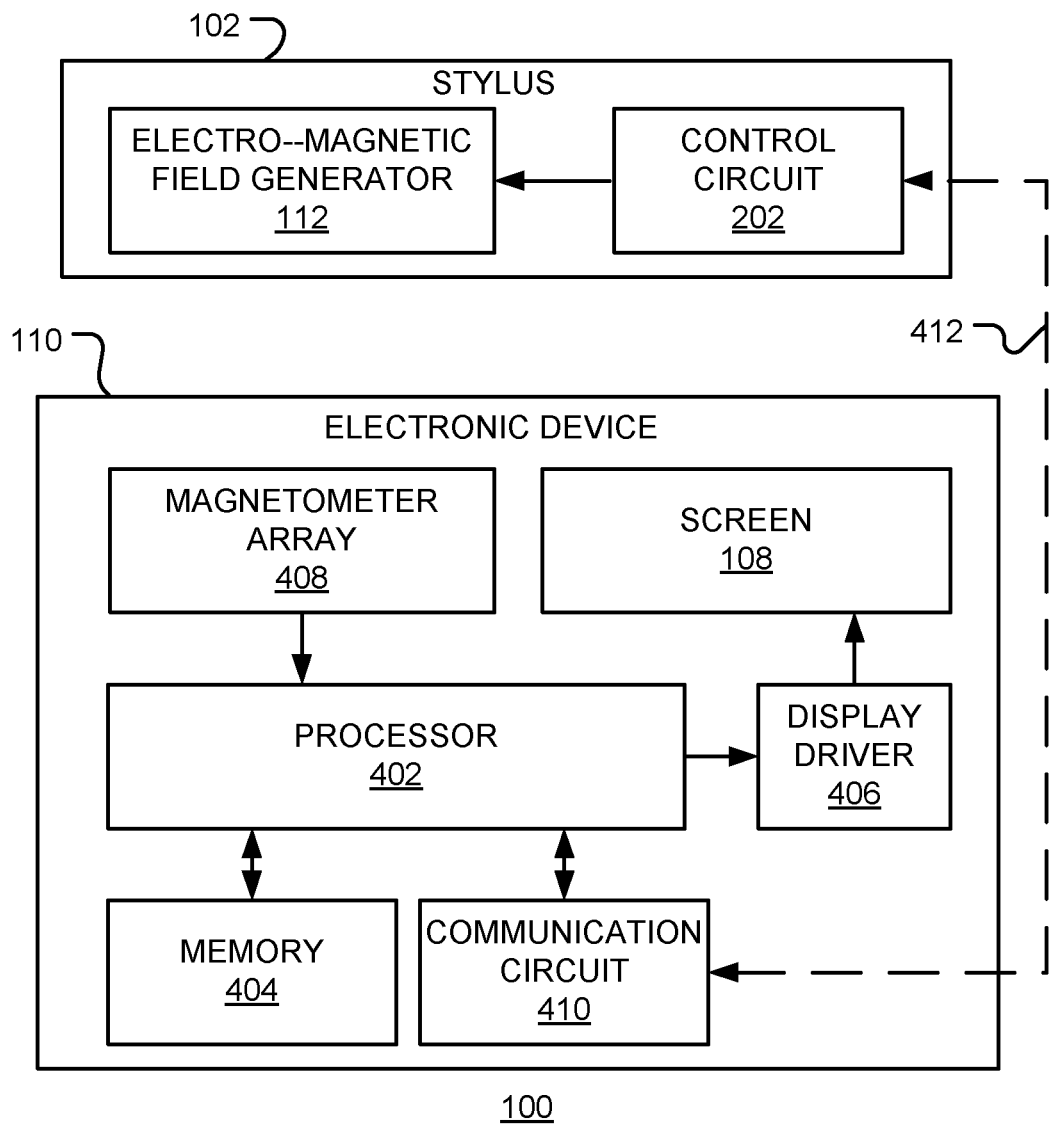
FIG. 4 is a block diagram of a stylus and a host electronic device, in accordance with illustrative embodiments of the present disclosure.

FIG. 4 is a block diagram of a stylus and host electronic device, in accordance with exemplary embodiments of the present disclosure. The host electronic device 110 includes a processor 402 coupled to a memory 404. The processor 402 is also coupled to a display driver 406 that is used to render images on a screen 108. The memory 404 may be used to store an operating system and various user applications that may be executed on the processor 402. The operating system and user applications control the processor to display elements of a graphical user interface on the screen 108. The stylus 102 may be used by a user to interact with the displayed graphical user interface to provide input to the operating system or other user applications executed on the processor 402. The communication module 206 in the control circuit 202 in the stylus 102 can communicate 412 communication signals with a communication circuit 410 coupled to the processor 402 in the host electronic device 110.

As discussed above, the stylus 102 includes a magnetic field generator 112, such as a coil or electromagnet. The magnetic field generator 112 is controlled by control circuit 202 of the stylus. In particular, the control circuit may be used to switch an electric current to the magnetic field generator 112 or to control the direction of the electric current.

Figure 5:
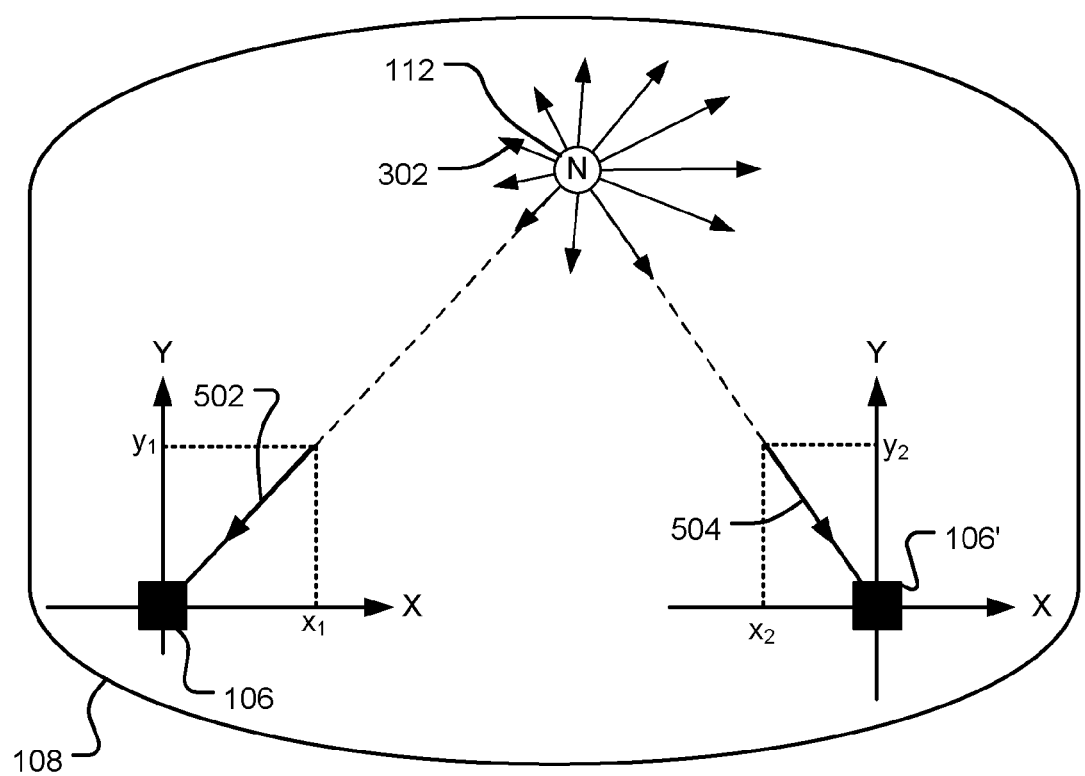
FIG. 5 is a diagram illustrating a method for stylus location, in accordance with illustrative embodiments of the present disclosure.

FIG. 5 shows how two directional magnetometers, 106 and 106', of a host electronic device may be employed to determine a location of the magnetic field generator 112. In this example, the magnetic field generator 112 of the stylus produces a magnetic field 302 that is substantially radial, although other magnetic field patterns may be used. The first directional magnetometer 106 senses a first magnetic field vector 502 comprising first components $(x_1, y_1)$ in the plane of the screen 108. A second directional magnetometer 106' senses a second magnetic field vector 504 comprising components $(x_2, y_2)$ of the magnetic field in the plane of the screen 108. Since the locations of the magnetometers 106 and 106' are known, a simple geometric triangulation may be used to determine the location of the magnetic field generator 112 with respect to the screen 108 of the electronic device. Determination of the location may be made by the processor under software control.

Additional magnetometers may be employed to enable to stylus location to be determined more accurately. The number of magnetometers used may range from as few as two or three to as large as hundreds or thousands. The magnetometers may be arranged in a rectangular grid, as depicted in FIG. 1.

Optionally, three or more magnetometers may be used, each sensing three components of the magnetic field. This enables the stylus to be located in three-dimensions.

When an energized coil of a stylus is held in close proximity to the array and the magnetometers are polled for direction of the field, their directions will point to the location in space where the field originates, thus giving a 3D location of the stylus tip.

Figure 6:
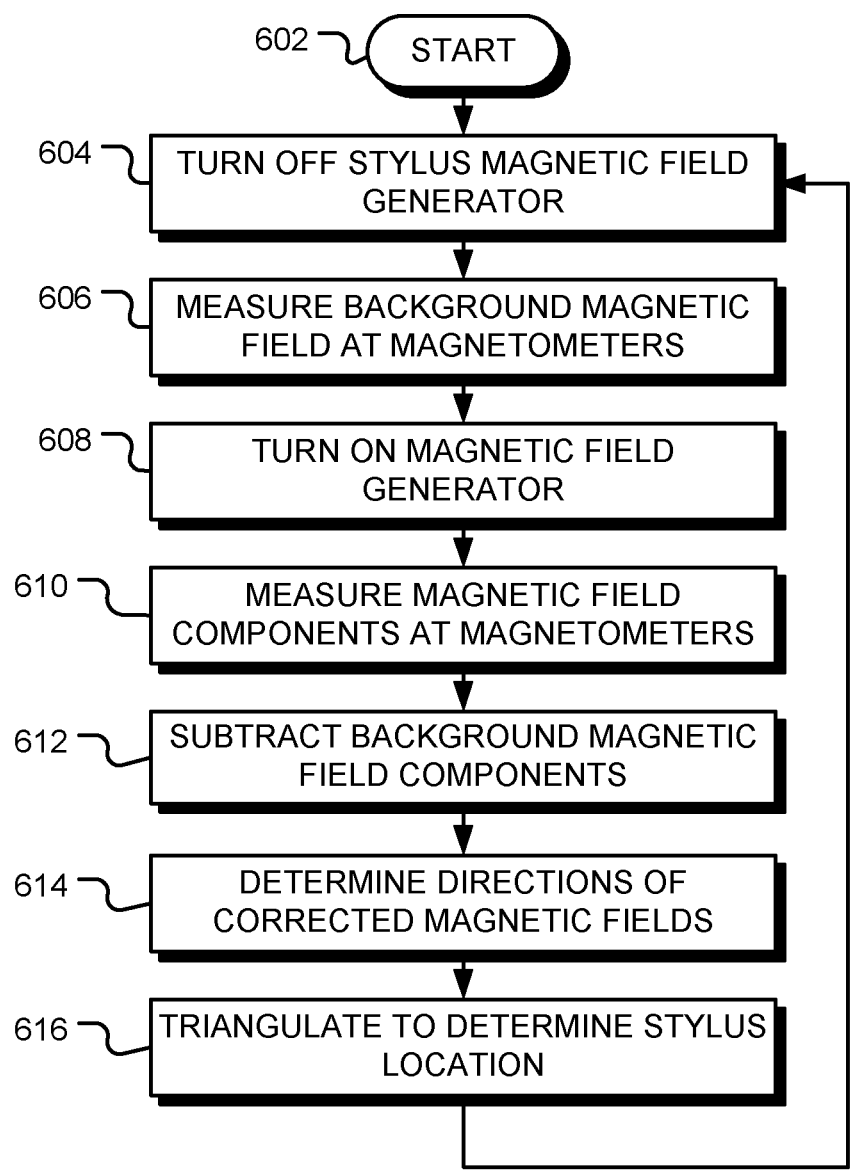
FIG. 6 is a flow chart of a method for stylus location, in accordance with exemplary embodiments of the present disclosure.

FIG. 6 is a flow chart 600 of a method for stylus location, in accordance with embodiments of the present disclosure. The magnetic field sensed by the magnetometers is a combination of the ambient, or background, magnetic field and the field generated by the stylus. The background magnetic field includes the magnetic field of the Earth, which varies dependent upon the orientation of the host electronic device, and stray electromagnetic fields produced by operation of the host electronic device. Following start block 602 in FIG. 6, the magnetic field generator of the stylus is turned off at block 604. This enables components of the background magnetic field to be measured at block 606 using the magnetometers. This measurement is stored. The magnetic generator of the stylus is activated at block 608, enabling a combination of the stylus magnetic field and the background magnetic field to be measured at block 610. The corrected magnetic field, due to the stylus alone, is found at block 612 by subtracting the background magnetic field measurement from the activated measurement to find the differences in the measurements. At block 614, the directions of the magnetic field are determined from the corrected components, and the stylus location is determined at block 616. The locations may be found by triangulation, for example. Correcting for the background magnetic field improves the accuracy of the stylus location.

Variations of this approach will be apparent to those of ordinary skill in the art. For example, an average of the background magnetic field measurements before and after the activated measurement may be subtracted to better account for variations in the background magnetic field as the stylus moves. As another example, the background magnetic field at the time of the activated measurement may be predicated from prior or post measurements of the background magnetic field and measurements of stylus motion.

In an alternative embodiment, the magnetic field generator is activated in a first polarity to obtain a first measurement and then in a reverse polarity to obtain a second measurement. Again, the magnetic field due to the stylus alone may be determined from the difference between the first and second measurements.

The implementations of the present disclosure described above are intended to be merely exemplary. It will be appreciated by those of skill in the art that alterations, modifications and variations to the illustrative embodiments disclosed herein may be made without departing from the scope of the present disclosure. Moreover, selected features from one or more of the above-described illustrative embodiments may be combined to create alternative embodiments not explicitly shown and described herein.

It will be appreciated that any module or component disclosed herein that executes instructions may include or otherwise have access to non-transient and tangible computer readable media such as storage media, computer storage media, or data storage devices (removable or non-removable) such as, for example, magnetic disks, optical disks, or tape data storage. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the server, any component of or related to the network, backend, etc., or accessible or connectable thereto. Any application or module herein described may be implemented using computer readable/executable instructions that may be stored or otherwise held by such computer readable media.

The present disclosure may be embodied in other specific forms without departing from its spirit or essential characteristics. The described exemplary embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
a first directional magnetometer, operable to sense a first magnetic field vector comprising two or more first components of a magnetic field produced by an electromagnetic field generator in proximity to the electronic device, the electromagnetic field generator being operatively coupled with a communication module;
at least one second directional magnetometer, operable to sense at least one second magnetic field vector comprising two or more components of the magnetic field produced by the magnetic field generator; and
a processor, operatively coupled with a communication circuit to communicate a communication signal with the electromagnetic field generator via the communication module, and coupled to the first and second directional magnetometers and responsive to the first magnetic field vector and the at least one second magnetic field vector, the processor operable to determine a location of the magnetic field generator with respect to the electronic device, the electromagnetic field generator being controllable based on the communication signal received from the processor via the communication module, to alternatively provide the magnetic field in a first polarity and in a second polarity opposite the first polarity.

2. The electronic device of claim 1, where the electromagnetic field generator is located in a stylus and where the communication circuit of the electronic device
being operable to communicate with a control circuit of the stylus that controls an electric current supplied to the electromagnetic field generator of the stylus, the control circuit being operable to control the direction of the electric current supplied to the electromagnetic field generator to alternatively produce the magnetic field in the first polarity and in the second polarity opposite the first polarity.

3. The electronic device of claim 1, where the processor is further operable to:
determine a first magnetic field comprising the first magnetic field vector and the at least one second magnetic field vector sensed when the magnetic field generator is active producing a magnetic field in the first polarity; and
determine a second magnetic field comprising the first magnetic field vector and the at least one second magnetic field vector sensed when the magnetic field generator is active producing a magnetic field in the second polarity opposite the first polarity,
and where the processor is responsive to a difference between the second magnetic field and the first magnetic field to determine the location of the magnetic field generator with respect to the electronic device.

4. The electronic device of claim 1, where the first directional magnetometer and the at least one second directional magnetometer comprise an array of magnetometers.

5. The electronic device of claim 4, further comprising a screen, where the array of magnetometers comprises a planar array aligned with and in close proximity to the screen.

6. The electronic device of claim 1, where the first directional magnetometer comprises a two-axis magnetometer.

7. The electronic device of claim 1, where the first directional magnetometer comprises a three-axis magnetometer.

8. A stylus operable to provide input to a host electronic device, the stylus comprising:
an electromagnetic field generator to generate and transmit a magnetic field in a first polarity and alternatively a magnetic field in a second polarity opposite the first polarity for sensing the magnetic field in the first polarity and the magnetic field in the second polarity by one or more magnetometers in the host electronic device in proximity to the stylus;
a control circuit operable to provide, and control the direction of, an electric current coupled to the electromagnetic field generator to alternatively generate the magnetic field in the first polarity and the magnetic field in the second polarity opposite the first polarity; and
a communication module operatively coupled to the control circuit and operable to communicate with the host electronic device, the control circuit being responsive to a communication signal received from the host electronic device via the communication module to generate the magnetic field in the first polarity and the magnetic field in the second polarity based on the communication signal.

9. The stylus of claim 8, where the electromagnetic field generator comprises a coil located in close proximity to a ferrous body.

10. The stylus of claim 8, where the control circuit is responsive to a communication signal received from the communication module.

11. The stylus of claim 8, where the communication module is operable to communicate a state of the control circuit to the host electronic device.

12. The stylus of claim 8, further comprising:
a contact sensor operable to sense when a tip of the stylus is in contact with a screen of the host electronic device, where the communication module is operable to communicate to the host electronic device when the tip of the stylus is in contact with the screen of the host electronic device.

13. A method for determining a location of a stylus relative to a host electronic device, comprising:
activating an electromagnet of the stylus to alternatively produce at the stylus a first magnetic field having a first polarity and a second magnetic field having a second polarity opposite the first polarity, by communicating a communication signal from a communication circuit in the host electronic device to a communication module in the stylus, a control circuit in the stylus being responsive to the communication signal received from the host electronic device via the communication module to control the electromagnet to produce the first and second magnetic fields based on the communication signal;
sensing at least one of the first magnetic field and the second magnetic field at two or more magnetometers of the host electronic device; and
determining the location of the stylus with respect to the host electronic device dependent upon the sensed at least one of the first magnetic field and the second magnetic field.

14. The method of claim 13, further comprising:
sensing alternatively the first magnetic field and the second magnetic field at two or more magnetometers of the host electronic device;
where determining the location of the stylus with respect to the host electronic device is dependent upon the sensed first and second magnetic fields.

15. The method of claim 14, further comprising:
determining the location of the stylus with respect to the host electronic device dependent upon a difference between the first and second magnetic fields.

16. The method of claim 14, further comprising:
energizing an electric current in a first direction in the electromagnet of the stylus to produce the first magnetic field in the first polarity when the first magnetic field is sensed;
energizing an electric current in a second direction opposite the first direction in the electromagnet of the stylus to produce the second magnetic field in the second polarity, opposite to the first polarity, when the second magnetic field is sensed; and
determining the location of the stylus with respect to the host electronic device dependent upon a difference between the first and second magnetic fields.

17. The method of claim 13, where determining the location of the stylus with respect to the host electronic device comprises:
determining directions of the first and second magnetic fields at the two or more magnetometers.

18. A non-transitory computer-readable medium having computer-executable instructions that, when executed by a processor of a host electronic device, cause the host electronic device to determine a location of a stylus relative to the host electronic device, by:
controlling an electromagnetic field generator at the stylus to produce magnetic fields of the stylus by transmitting a communication signal from a communication circuit at the host electronic device to a communication module at the stylus, each of the produced magnetic fields having a polarity based on the communication signal received by the communication module at the stylus;
sensing first magnetic vectors at two or more magnetometers of the host electronic device, the first magnetic field vectors dependent in part upon a first magnetic field of the stylus;
sensing second magnetic vectors at the two or more magnetometers of the host electronic device, the second magnetic field vectors dependent in part upon a second magnetic field of the stylus, the second magnetic field having a different polarity from a polarity of the first magnetic field; and
determining the location of the stylus with respect to the host electronic device dependent upon at least the sensed polarity of the first and second magnetic field vectors.

19. The non-transitory computer-readable medium of claim 18 having further computer-executable instructions that, when executed by the processor of the host electronic device, cause the host electronic device to determine a location of a stylus relative to the host electronic device, by:
cooperating with the stylus by transmitting a communication signal from the communication circuit at the host electronic device for reception by the communication module at the stylus such that the first magnetic field of the stylus is a zero magnetic field and the second magnetic field of the stylus is a non-zero magnetic field having a polarity selected from two opposite polarities; and
determining the location of the stylus with respect to the host electronic device dependent upon a difference between the first and second magnetic field vectors.

20. The non-transitory computer-readable medium of claim 18 having further computer-executable instructions that, when executed by the processor of the host electronic device, cause the host electronic device to determine a location of a stylus relative to the host electronic device, by:
cooperating with the stylus by transmitting a communication signal from the communication circuit at the host electronic device to the communication module at the stylus such that the polarity of the first magnetic field of the stylus is opposite to the polarity of the second magnetic field of the stylus; and
determining the location of the stylus with respect to the host electronic device dependent upon a difference between the first and second magnetic field vectors.

21. A system comprising:
a stylus comprising:
an electromagnetic field generator;
a control circuit operable to provide an electric current to the electromagnetic field generator in one of two opposite directions to generate and transmit a magnetic field of the stylus in one of two opposite polarities; and
a communication module operatively coupled to the control circuit to couple a communication signal received from the host electronic device to the control circuit to provide the electric current to the electromagnetic field generator in one of the two opposite directions based on the communication signal; and a host electronic device comprising:
- a first directional magnetometer, operable to sense a first magnetic field vector comprising two or more first components of a magnetic field produced by the electromagnetic field generator of the stylus;
- at least one second directional magnetometer, operable to sense at least one second magnetic field vector comprising two or more components of the magnetic field produced by the electromagnetic field generator of the stylus;
- a processor coupled to the first and second directional magnetometers and responsive to the first magnetic field vector and the at least one second magnetic field vector, the processor operable to determine a location of the electromagnetic field generator of the stylus with respect to the electronic device based at least on a sensed polarity of the magnetic field of the stylus; and
- a communication circuit, coupled with the processor, operable to communicate with the communication module of the stylus to transmit the communication signal to the communication module.

* * * * *